(12) United States Patent
Chang et al.

(10) Patent No.: US 11,614,831 B2
(45) Date of Patent: *Mar. 28, 2023

(54) PRESSURE CALIBRATION METHOD AND TOUCH SENSITIVE PROCESS APPARATUS AND TOUCH SYSTEM IMPLEMENTING THE METHOD

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,875

(22) Filed: Nov. 19, 2021

(65) Prior Publication Data

US 2022/0206628 A1 Jun. 30, 2022

(30) Foreign Application Priority Data

Dec. 25, 2020 (TW) .................................. 109146432

(51) Int. Cl.
*G06F 3/041* (2006.01)
*G06F 3/044* (2006.01)

(52) U.S. Cl.
CPC .......... *G06F 3/0418* (2013.01); *G06F 3/0445* (2019.05); *G06F 3/0446* (2019.05); *G06F 3/0447* (2019.05); *G06F 3/04144* (2019.05); *G06F 2203/04106* (2013.01)

(58) Field of Classification Search
CPC .... G06F 3/0418; G06F 3/0445; G06F 3/0446; G06F 3/044; G06F 3/0416; G06F 3/0414; G06F 2203/04106; G06F 3/04144; G06F 3/0447

See application file for complete search history.

(56) References Cited

U.S. PATENT DOCUMENTS

| | | | | |
|---|---|---|---|---|
| 10,429,981 B2* | 10/2019 | Noguchi | ............... | G06F 3/0446 |
| 2014/0307186 A1* | 10/2014 | Yun | ....................... | G06F 3/0445 349/12 |
| 2015/0378491 A1* | 12/2015 | Worfolk | ............... | G06F 3/0416 345/174 |

(Continued)

FOREIGN PATENT DOCUMENTS

| | | | | |
|---|---|---|---|---|
| CN | 103823592 B | * | 4/2017 | ............. G06F 3/041 |
| WO | WO-2016195309 A1 | * | 12/2016 | ........... G06F 3/0414 |

*Primary Examiner* — Darlene M Ritchie
(74) *Attorney, Agent, or Firm* — WPAT, PC

(57) ABSTRACT

A pressure calibration method, applicable to a touch panel which sequentially comprises a first electrode layer, an elastic dielectric layer and a second electrode layer, the first electrode layer includes multiple first electrodes in parallel to a first axis, the second electrode layer includes multiple second electrodes in parallel to a second axis, the pressure calibration method comprising: retrieving a depression event according to mutual capacitance sensing between the first electrodes and the second electrodes; finding a corresponding calibration area according to coordinate of the depression event; and calculating a calibrated pressure value according to a pressure sensing value of the depression event and a pressure calibration function of the corresponding calibration area.

13 Claims, 12 Drawing Sheets

(56) References Cited

U.S. PATENT DOCUMENTS

| | | | | |
|---|---|---|---|---|
| 2016/0370899 A1* | 12/2016 | Chang | ................ | G06F 3/04142 |
| 2017/0068383 A1* | 3/2017 | Chern | .................... | G06F 3/044 |
| 2017/0315650 A1* | 11/2017 | Reynolds | .............. | G06F 3/0412 |
| 2018/0107302 A1* | 4/2018 | Takada | ................ | G02B 6/0056 |
| 2019/0243502 A1* | 8/2019 | Nathan | .............. | G06F 3/04166 |
| 2021/0048916 A1* | 2/2021 | Chen | .................. | G06F 3/04142 |

* cited by examiner

PRESSURE CALIBRATION METHOD AND TOUCH SENSITIVE PROCESS APPARATUS AND TOUCH SYSTEM IMPLEMENTING THE METHOD

CROSS REFERENCE TO RELATED PATENT APPLICATION

This patent application is based on a Taiwan, R.O.C. patent application No. 109146432 filed on Dec. 25, 2020.

FIELD OF THE INVENTION

The present invention relates to touch sensitive control, and more particularly, to calibration of measured touch pressure.

BACKGROUND OF THE INVENTION

Touch panels or screens are common input devices of modern electronic devices. In addition to specify a position by a stylus or a finger, user may further control a force pressing to the touch panel. The control of pressure improves user's experience.

However, touch panels may be made with defects or tolerances. For examples, widths of touch electrodes may be inconsistent or surface of the touch panel is slightly bended. When measuring pressure at different locations of the touch panel, different values would be gathered. Thus, it is desired to have a mechanism for calibrating pressure values measured by the touch panel such that error occurred in measurement can be reduced.

SUMMARY OF THE INVENTION

The present application provides a pressure calibration method and a touch sensitive processing apparatus and a touch system for implementing the pressure calibration method. Besides, the present application also provides a pressure calibration function calculation method and a touch sensitive processing apparatus and a touch system for implementing the pressure calibration function calculation method. By dividing touch surface of a touch panel into multiple smaller calibration areas and measuring at one or more vertexes of the calibration areas as calibration points, a pressure calibration function corresponding to its calibration area can be calculated so as the measured pressure error caused by local defects of the calibration area can be corrected.

According to an embodiment of the present application, a pressure calibration method is provided. The pressure calibration method is applicable to a touch panel which sequentially comprises a layer of first electrodes, an elastic dielectric layer, and a layer of second electrodes. The layer of first electrodes includes multiple first electrodes in parallel to a first axis. The layer of second electrodes includes multiple second electrodes in parallel to a second axis. The pressure calibration method comprising: gathering a touching event by utilizing mutual capacitance sensing between the first electrodes and the second electrodes; looking for a corresponding calibration area according to coordinates of the touching event; and calculating a calibrated pressure value according to a measured pressure value corresponding to the touching event and a pressure calibration function corresponding to the calibration area.

According to an embodiment of the present application, a pressure calibration method is provided. The pressure calibration method is applicable to a touch panel which sequentially comprises a layer of first electrodes, an elastic dielectric layer, a layer of second electrodes. The layer of first electrodes includes multiple first electrodes in parallel to a first axis. The layer of second electrodes includes multiple second electrodes in parallel to a second axis. The touch panel further includes multiple third layers in parallel to the first axis. The pressure calibration method comprising: gathering an approaching event by utilizing the second electrodes and the third electrodes; gathering a touching event corresponding to the approaching event by utilizing mutual capacitance sensing between the first electrodes and the second electrodes; looking for a calibration area according to the approaching event; and calculating a calibrated pressure value according to a measured pressure value corresponding to the approaching event and a pressure calibration function corresponding to the calibration area.

According to an embodiment of the present application, a touch sensitive processing apparatus for pressure calibration is provided. The touch sensitive processing apparatus is coupled to a touch panel which sequentially comprises a layer of first electrodes, an elastic dielectric layer, and a layer of second electrodes. The layer of first electrodes includes multiple first electrodes in parallel to a first axis. The layer of second electrodes includes multiple second electrodes in parallel to a second axis. The touch sensitive processing apparatus comprising: an interconnection network, configured to connect to one or more the first electrodes and one or more the second electrodes, respectively; a driving circuit, configured to connect to the interconnection network for transmitting driving signals; a sensing circuit, configured to connect to the interconnection network for sensing induced driving signals; and a processor, coupled to the interconnection network, the driving circuit and the sensing circuit, configured to execute instructions stored in a non-volatile memory to realize the following steps: gathering a touching event by utilizing mutual capacitance sensing between the first electrodes and the second electrodes; looking for a corresponding calibration area according to coordinates of the touching event; and calculating a calibrated pressure value according to a measured pressure value corresponding to the touching event and a pressure calibration function corresponding to the calibration area.

According to an embodiment of the present application, a touch sensitive processing apparatus for pressure calibration is provided. The touch sensitive processing apparatus is coupled to a touch panel which sequentially comprises a layer of first electrodes, an elastic dielectric layer, and a layer of second electrodes. The layer of first electrodes includes multiple first electrodes in parallel to a first axis. The layer of second electrodes includes multiple second electrodes in parallel to a second axis. The touch panel further includes multiple third layers in parallel to the first axis. The touch sensitive processing apparatus comprising: an interconnection network, configured to connect to one or more the first electrodes, one or more the second electrodes and one or more the third electrodes, respectively; a driving circuit, configured to connect to the interconnection network for transmitting driving signals; a sensing circuit, configured to connect to the interconnection network for sensing induced driving signals; and a processor, coupled to the interconnection network, the driving circuit and the sensing circuit, configured to execute instructions stored in a non-volatile memory to realize the following steps: gathering an approaching event by utilizing the second electrodes and the third electrodes; gathering a touching event corresponding to the approaching event by utilizing mutual capacitance sensing between the first electrodes and the second electrodes; looking for a calibration area according to the approaching event; and calculating a calibrated pressure value according to a measured pressure value corresponding to the approaching event and a pressure calibration function corresponding to the calibration area.

According to an embodiment of the present application, a touch system for pressure calibration is provided. The touch system comprising the aforementioned touch sensitive processing apparatus; and the touch panel coupled to the touch sensitive processing apparatus.

According to an embodiment of the present application, a pressure calibration function calculation method is provided. The pressure calibration function calculation method is applied to a touch panel which sequentially comprises a layer of first electrodes, an elastic dielectric layer, and a layer of second electrodes. The layer of first electrodes includes multiple first electrodes in parallel to a first axis. The layer of second electrodes includes multiple second electrodes in parallel to a second axis. The pressure calibration function calculation method comprising: by utilizing mutual capacitance sensing between the first electrodes and the second electrodes, measuring pressure values corresponding to calibration points when being pressed by a standard test pressure value, wherein the touch panel comprises multiple calibration areas and each calibration area corresponds to one or more of the calibration points; and calculating a pressure calibration function corresponding to each of the calibration areas according to coordinates of the calibration points, the standard test pressure value and the measured pressure values of the calibration points.

According to an embodiment of the present application, a touch sensitive processing apparatus for pressure calibration function calculation is provided. The sensitive processing apparatus is coupled to a touch panel which sequentially comprises a layer of first electrodes, an elastic dielectric layer, and a layer of second electrodes. The layer of first electrodes includes multiple first electrodes in parallel to a first axis. The layer of second electrodes includes multiple second electrodes in parallel to a second axis. The touch sensitive processing apparatus comprising: an interconnection network, configured to connect one or more the first electrodes and one or more the second electrodes; a driving circuit, configured to transmit driving signals via the interconnection network, a sensing circuit, configured to sense induced driving signals via the interconnection network; and a processor, coupled to the interconnection network, the driving circuit and the sensing circuit, configured to execute instructions stored in non-volatile memory to realize the following steps: by utilizing mutual capacitance sensing between the first electrodes and the second electrodes, measuring pressure values corresponding to calibration points when being pressed by a standard test pressure value, wherein the touch panel comprises multiple calibration areas and each calibration area corresponds to one or more of the calibration points; and calculating a pressure calibration function corresponding to each of the calibration areas according to coordinates of the calibration points, the standard test pressure value and the measured pressure values of the calibration points.

According to an embodiment of the present application, a touch system for pressure calibration function calculation is provided. The touch system comprising the aforementioned touch sensitive processing apparatus; and the touch panel coupled to the touch sensitive processing apparatus.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
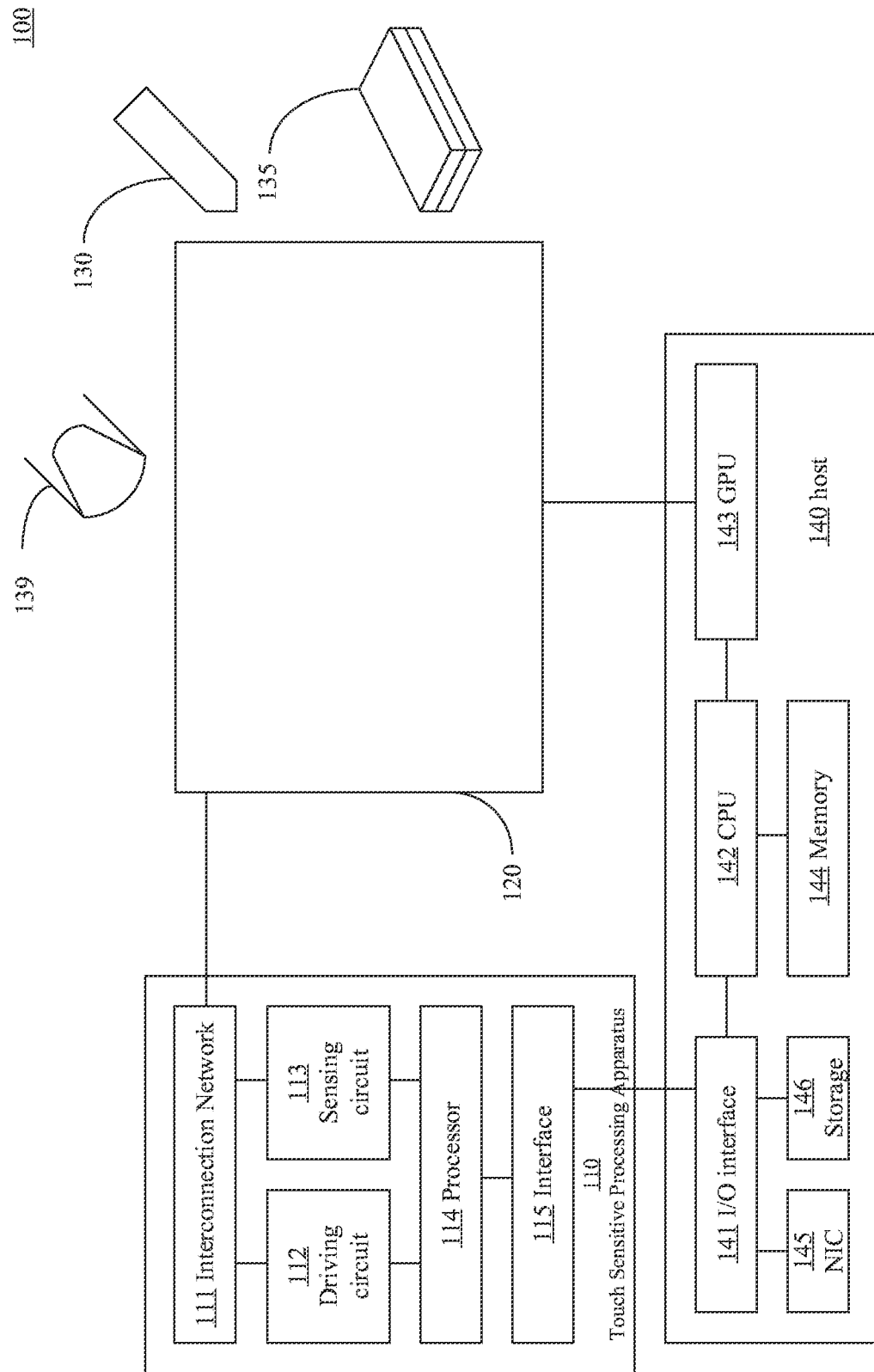
FIG. 1 shows a block diagram of a touch system in accordance with an embodiment of the present invention.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which shows a block diagram of a touch system 100 in accordance with an embodiment of the present invention. The touch system 100 may be a computer system such as a desktop computer, a laptop computer, a tablet computer, an industrial control computer, a smartphone or any other kinds of computer having touch sensitive function.

The touch system 100 may comprise a touch sensitive processing apparatus 110, a touch panel or screen 120 coupled to the touch sensitive processing apparatus 110, and a host coupled to the touch sensitive processing apparatus 110. The touch system 100 may further comprises one or more styli 130 and/or touch board eraser 135. Hereinafter the touch panel or screen 120 is referred as the touch screen 120. However, in the embodiments lacking of display function, persons having ordinary skill in the art can understand the touch screen denoted in the present application may be referred to a touch panel.

The touch screen 120 may comprise multiple first electrodes 121 in parallel to a first axis, multiple second electrodes 122 in parallel to a second axis and one or more third electrodes 123. The first electrodes 121 may intersect with the second electrodes 122 in order to form multiple sensing points or sensing areas. Equivalently, the second electrodes 122 may intersect with the first electrodes 121 in order to form multiple sensing points or sensing areas. In some embodiments of the present application, the first electrodes 121 may be referred as first touch electrodes 121, the second electrodes 122 may be referred as second touch electrodes 122, and the third electrodes 123 may be referred as third touch electrodes 123. The first electrodes 121, the second electrodes 122 and the third electrodes 123 may be collectively referred as touch electrodes. In some embodiments with touch screens 120, the first electrodes 121, the second electrodes 122 and the third electrodes 123 are made by transparent material. The first electrodes 121 and the second electrodes 122 may be disposed in one electrode layer. Conductive plates of each one of the first electrodes 121 or the second electrodes 122 may be connected by bridging. The first electrodes 121 and the second electrodes 122 may be disposed at different overlapping electrode layers. Unless described specifically, the present application may be applied to the embodiments having one or more electrode layers. The first axis and the second axis are perpendicular in most cases. However, the present application does not limit that the first axis and the second axis are perpendicular. In one embodiment, the first axis may be a horizontal axis or a pixel refreshing axis of the touch screen 120.

Figure 2B:
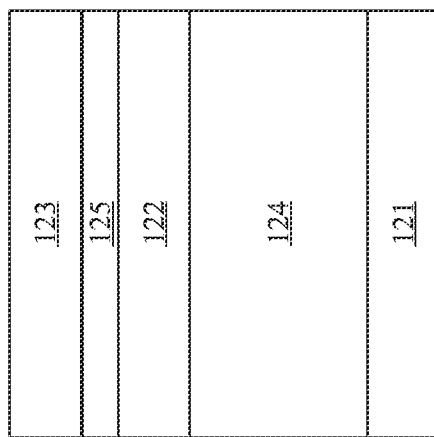
FIGS. 2A-2D illustrates section views of touch screens in accordance with embodiments of the present invention.
Figure 2A:
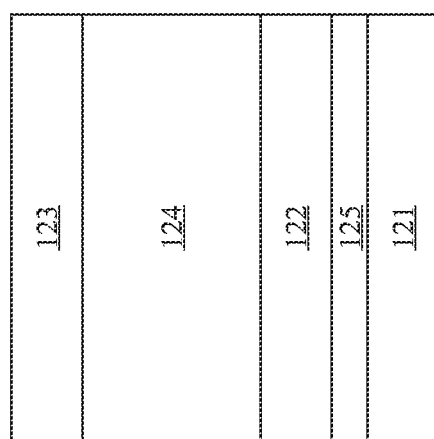

Please refer to FIG. 2A, which illustrates a section view of a touch screen 120 in accordance with an embodiment of the present invention. The touch screen 120 comprises a structure including the aforementioned electrode layers. The structure sequentially includes a layer of third electrodes 123, an elastic dielectric layer 124, a layer of second electrodes 122, a dielectric layer 125 and a layer of first electrodes 121. Persons having ordinary skill in the art can understand that the touch screen 120 may include other display structures or layers which are omitted in order to clearly show the inventive features.

The layer of third electrodes 123 is closest to an external object or an external conductive object 139 like a finger. The elastic dielectric layer 124 is sandwiched in between the layer of third electrodes 123 and the layer of second electrodes 122 in order to isolate the second electrodes 122 from the third electrodes 123. When the external object 139 downwardly contacts the touch screen 120, the layer of third electrodes 123 and the elastic dielectric layer 124 deforms because of being pressed. Accordingly, distances between the layer of third electrodes 123 and the layer of second electrodes 123 are shortened. Capacitances between the second electrodes 122 and the third electrodes 123 are changed according to the varied distances.

Please refer to FIG. 2B, which illustrates a section view of a touch screen 120 in accordance with an embodiment of the present invention. Comparing with the embodiment as shown in FIG. 2A, the elastic dielectric layer 124 as shown in FIG. 2B is sandwiched in between the layer of first electrodes 121 and the layer of second electrodes 122. The dielectric layer 125 is sandwiched in between the layer of third electrodes 123 and the layer of second electrodes 122 in order to isolate the second electrodes 122 from the third electrodes 123. When the external conductive object 139 downwardly contacts the touch screen 120, the elastic dielectric layer 124 deforms because of being pressed. Accordingly, distances between the layer of first electrodes 121 and the layer of second electrodes 122 are shortened. Capacitances between the first electrodes 121 and the second electrodes 122 are changed according to the varied distances.

Figure 2D:
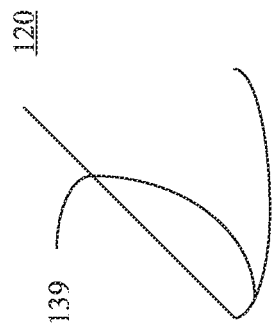
Figure 2D:
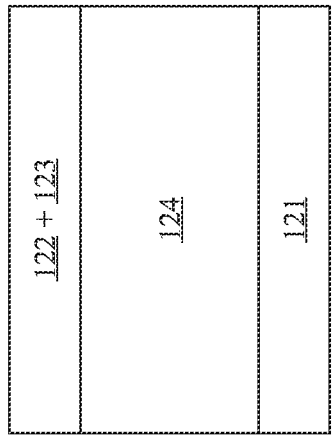
Figure 2C:
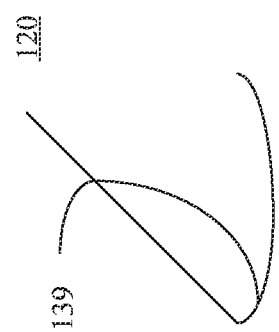
Figure 2C:
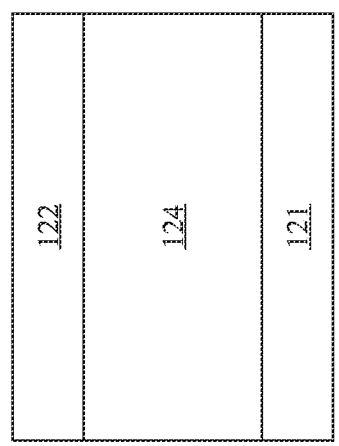

Please refer to FIG. 2C, which illustrates a section view of a touch screen 120 in accordance with an embodiment of the present invention. The elastic dielectric layer 124 as shown in FIG. 2B is sandwiched in between the layer of first electrodes 121 and the layer of second electrodes 122. When the external object 139 downwardly contacts the touch screen 120, the elastic dielectric layer 124 deforms because of being pressed. Accordingly, distances between the layer of first electrodes 121 and the layer of second electrodes 122 are shortened. Capacitances between the first electrodes 121 and the second electrodes 122 are changed according to the varied distances.

Please refer to FIG. 2D, which illustrates a section view of a touch screen 120 in accordance with an embodiment of the present invention. The multiple third electrodes 123 and the multiple second electrodes 122 are disposed in one layer. Each of the second electrodes 122 intersects with the third electrodes 123 at their bridging parts. The third electrodes 123 may be in parallel to the first axis like the first electrodes 121.

In the embodiment as shown in FIG. 2A, since the layer of third electrodes 123 is adjacent to the layer of second electrodes 122, the third electrodes 123 are in parallel to the first axis like the first electrodes 121. In the embodiment as shown in FIG. 2B, since the layer of third electrodes 123 is adjacent to the layer of first electrodes 121, the third electrodes 123 are in parallel to the second axis like the second electrodes 122. However, the present application does not limit that the third electrodes 123 shall be in parallel to different axes with electrodes in the adjacent layer.

The touch sensitive processing apparatus 110 as shown in FIG. 1 may comprise following hardware circuit: an interconnection network 111, a driving circuit 112, a sensing circuit 113, a processor 114, and an interface 115. The touch sensitive processing apparatus 110 may be implemented inside a single integrated circuit which may include one or more chips. It may use multiple integrated circuits and an interconnected circuit board carried the multiple integrated circuits to realize the touch sensitive processing apparatus 110. The touch sensitive processing apparatus 100 may be implemented in single integrated circuits with the host 140. The present application does not limit how to implement the touch sensitive processing apparatus 110.

The interconnection network 111 is configured to connect each of the multiple first electrodes 121, the multiple second electrodes 122 and/or the multiple third electrodes 123 of the touch screen 120. The interconnection network 111 may follow control command of the processor 114 for connecting the driving circuit 112 and any one or more touch electrodes and for connecting the sensing circuit 113 and any one or more touch electrodes. The interconnection network 111 may include a combination of one or more multiplexers (MUX) to realize the aforementioned functions.

Figure 3:
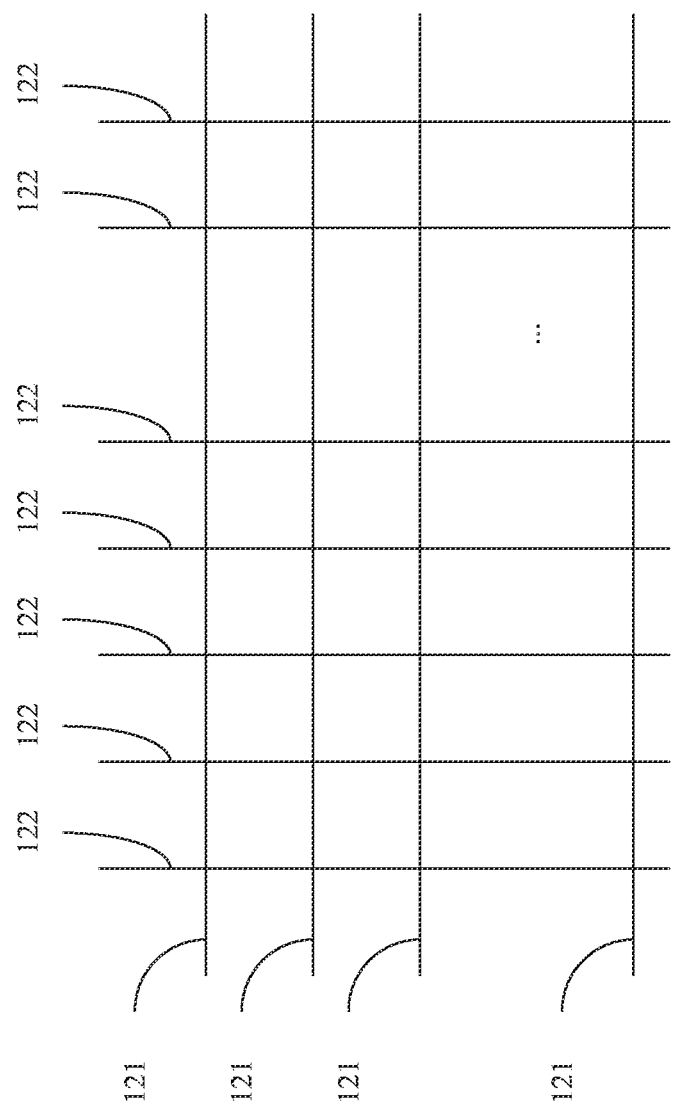
FIG. 3 depicts a top view of a touch screen in accordance with an embodiment of the present invention.

Please refer to FIG. 3 which depicts a top view of a touch screen 120 in accordance with an embodiment of the present invention. The interconnection network 111 may be used to connect the driving circuit 112 and/or the sensing circuit 113 to one or more of the first electrodes 121 or the second electrodes 122, respectively. The present application does not limit the way the interconnection network 111 use single routing or double routing to connect each of the first electrodes 121 and the second electrodes 122. In one embodiment, when the number of the third electrodes 123 is identical to the number of the first electrodes 121 and each one of the first electrodes 121 is vertically projected to one of the third electrodes 123, the first electrodes 121 as shown in FIG. 3 may be replaced by the third electrodes 123. That is, each of the second electrodes 122 intersects with all of the first electrodes 121 and all of the third electrodes 123 to form intersection areas.

The driving circuit 112 as shown in FIG. 1 may comprise clock generator, frequency divider, frequency multiplier, phase lock loop, power amplifier, DC-DC voltage converter, regulator and/or filter, which is configured to provide driving signal to any one or more touch electrodes via the interconnection network 111 according to control commands of the processor 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit 112 may include one or more channel. Each channel may be connected to any one or more touch electrodes via the interconnection network 111.

The sensing circuit 113 may comprise clock generator, frequency divider, frequency multiplier, phase lock loop, power amplifier, DC-DC voltage converter, regulator and/or filter, which is configured to sense on any one or more touch electrodes via the interconnection network 111 according to control commands of the processor 114. When the touch signal is transmitted from one of the touch electrodes, another touch electrode may induce the touch signal. And the sensing circuit 130 may demodulate the induced touch signal by the another touch electrode in accordance with the modulation method performed on the driving signal by the driving circuit 112 in order to restore the messages carried by the driving signal. The sensing circuit 113 may include one or more channels. Each channel may be connected to any one or more touch electrodes via the interconnection network 111. In the same time, each channel may simultaneously perform sensing and demodulation.

In one embodiment, the driving circuit 112 and the sensing circuit 113 may include analog front-end (AFE) circuits. In another embodiment, in additional to the AFE circuits, the driving circuit 112 and the sensing circuit 313 may include digital back-end (DBE) circuits. If the driving circuit 112 and the sensing circuit 113 include only the AFE circuits, the DBE circuits may be implemented in the processor 114.

The processor 114 may include a digital signal processor for connecting the AFE circuits or the DBE circuits of the driving circuit 112 and the sensing circuit 113, respectively. The processor 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network 111, the driving circuit 112, the sensing circuit 113 and the interface 115 of the touch sensitive processing apparatus 110. For examples, the processor 114 may comprises processors widely adopted in the industry such as 8051 series, Intel i960 series, ARM Cortex-M series and etc. The present application does not limit types and numbers of processor cores included in the processor 114.

The instructions and data may be used to implement each of steps mentioned in the present application and flows and methods constructed by the steps. Some instructions may be executed independently inside the processor 114, for examples, arithmetic and log operation instructions. Other instructions may be used to control other circuits of the touch sensitive processing apparatus 110. These instructions may include input/output interfaces of the processor 114 to control other circuits. Other circuits may provide information via the input/output interface of the processor 114 to the OS and/or application programs executed by the processor 114. Persons having ordinary skill in the art should have common knowledge of computer organization and architecture which enabling them to understand that the flows and methods provided by the present application can be realized by the circuits and the instructions.

The interface 115 may include kinds of serial or parallel bus, such as universal serial bus (USB), $I^2C$, peripheral component interconnect (PCI), PCI-Express, IEEE 1394 and other industrial standard input/output interface. The touch sensitive processing apparatus 110 connects to the host 140 via the interface 115.

The touch system 100 may comprise one or more styli 130 and/or touch board erasers 135. The stylus 130 and touch board eraser 135 may be transmitters which emit electrical signals. The transmitters may include active transmitter which actively emits electrical signals or passive transmitters which emit electrical signals in response to external electrical signals. The stylus 130 and touch board eraser 135 may comprise one or more electrodes which is configured to receive electrical signals from the touch screen 120 synchronously or asynchronously, or to transmit electrical signals to the touch screen 120 synchronously or asynchronously. The electrical signals may be modulated according to one or more of the aforementioned modulation methods.

The stylus 130 or touch board eraser 135 may be conductor which is configured to transmit driving signals or to be grounded via user's hand or body. The stylus 130 or touch board eraser 135 may be physically or wirelessly connected to an I/O interface 141 of the host 140 or any other interfacing circuits of the I/O interface 141.

The touch sensitive processing apparatus 110 may detect one or more external objects 139 such as fingers, palms or passive styli 130 or touch board erasers 135, or active styli 130 or touch board erasers 135 emitting electrical signals via the touch screen 120. The touch sensitive processing apparatus 110 may utilize mutual-capacitance sensing or self-capacitance sensing to detect external conductive objects. The styli 130 or touch board erasers 135 and touch sensitive processing apparatus 110 may use the aforementioned modulation and demodulation methods to transmit message via the electrical signals. The touch sensitive processing apparatus 110 may detect one or more positions where the styli 130 or touch board erasers 135 touch or approach the touch screen 120, status or sensors (pressure sensor or button) onboard the stylus 130 or touch board eraser 135, orientation angle or inclination angle of the stylus 130 or touch board eraser 135 with respect to the touch screen 120, and etc. according to the electrical signals.

The host 140 is a main apparatus for controlling the touch system 100. It may comprises an input/output interface 141 for connecting the interface 115, a central processing unit (CPU) 142, a graphics processor 143, a memory 144 connects to the CPU 142, a network interface 145 and a storage 146 connect to the input/output interface 141.

The storage 146 comprises non-volatile memory. Common examples are hard disks, electronic erasable rewritable read only memory (EEPROM), or flash memory. The storage 146 may store normal operating system and application programs executable under the operating system. The network interface 145 may comprise wired or wireless hardware network interface. The network interface 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU 142 may directly or indirectly connects to the input/output interface 141, the graphics processor 143, the memory 144, the network interface 145 and the storage 146. The CPU 142 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU 142 is able to control other circuits of the touch system 100.

The optional graphics processor (GPU) 143 is usually configured to handle computations with respect to graphics outputs. The graphics processor 143 may connect to the touch screen 120 for controlling outputs of the touch screen 120. In some applications, the host 140 may have the CPU 142 execute the computations with respect to graphics outputs, without dedicated handling of the graphics processor 143.

The host 140 may comprise components or apparatus not shown in FIG. 1, for example, audio input/output interface, keyboard input interface, mouse input interface, track-ball input interface and/or any other hardware circuits. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Figure 4:
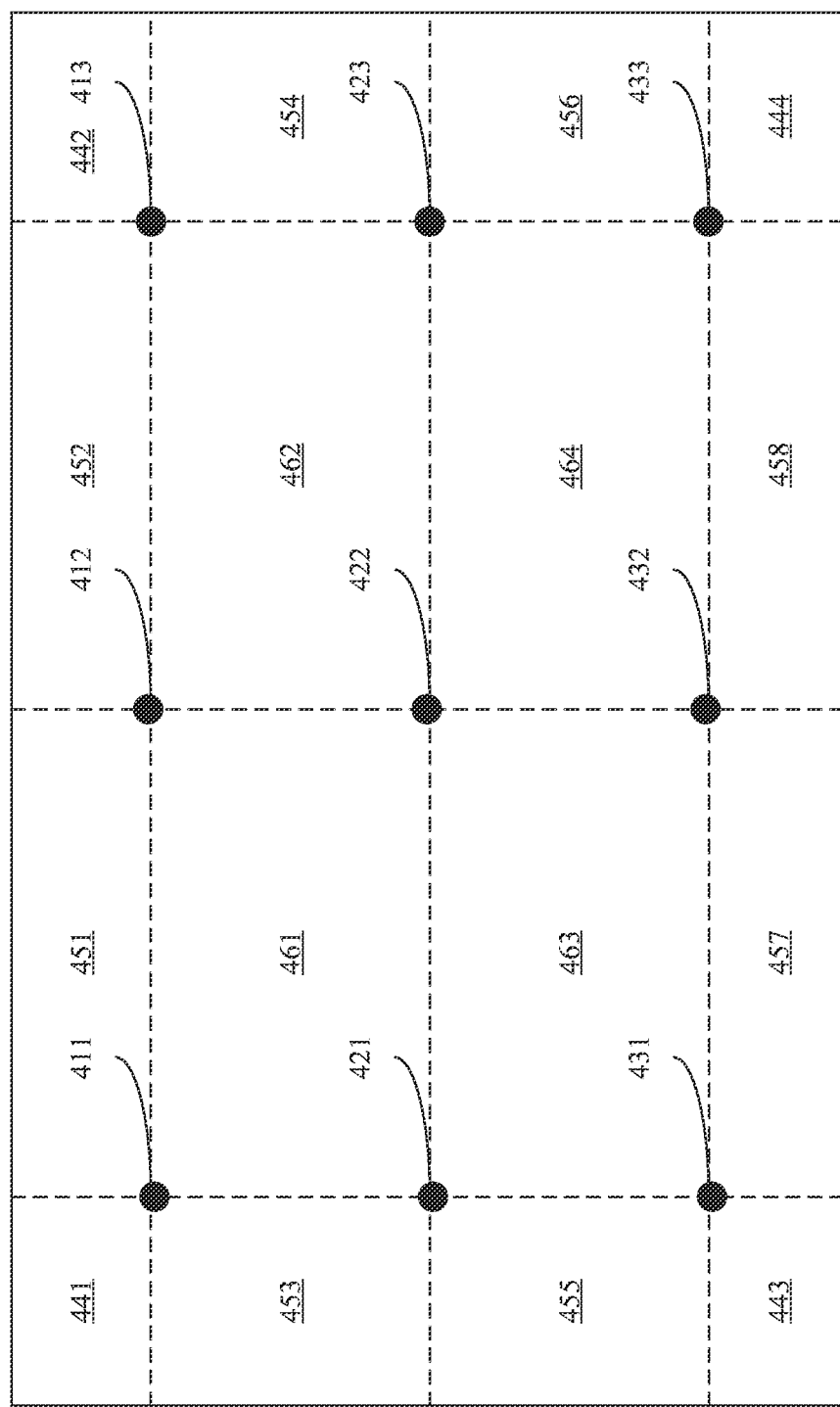
FIG. 4 illustrates calibration points and calibration areas in accordance with an embodiment of the present application.

Please refer to FIG. 4, which illustrates calibration points and calibration areas in accordance with an embodiment of the present application. Multiple calibration points may be designated on the touch screen 120. There are 9 calibration points 411~433 in the embodiment as shown in FIG. 4. However, person having ordinary skill in the art can understand that it is possible to designate 12, 16, 15 or any other number of calibration points on the touch screen 120.

In one embodiment, a calibration point may be located at an intersection of one of the second electrodes 122 and one of the first electrodes 121 or at an intersection of one of the second electrodes 122 and one of the third electrodes 123. In one embodiment, each one of the intersections that the second electrodes 122 intersect with other touch electrodes is a calibration point. In other words, the number of calibration points equals to the number of intersections. Person having ordinary skill in the art can understand that a calibration point may be designated to a point which is other than an intersection. However, since capacitance values at or near edges of the touch screen 120 are different from those at the internal areas of the touch screen 120, the calibration points may not be designated at or around the edges of the touch screen 120.

Three kinds of calibration areas may be found in the embodiment as shown in FIG. 4. First kind of calibration areas, e.g., multiple first calibration areas 461~463, are disposed in the internal area of the touch screen 120. Each of the first calibration areas is a rectangle. Its four vertexes are all calibration points. The first calibration areas are not disposed at the edges of the touch screen 120. Second kind of calibration areas, e.g., multiple second calibration areas 451~458, are disposed at the edges of the touch screen 120. Each one of the second calibration areas is a rectangle having two adjacent vertexes as calibration points. The second calibration area share one edge with the touch screen 120. Third kind of calibration areas, e.g., multiple third calibration areas 441~444, are disposed at the corners of the touch screen 120. Only one of the vertexes of the third calibration areas is a calibration point. Two adjacent edges of the third calibration area share two edges of the touch screen 120.

In one embodiment, shapes and area sizes of the first calibration area are identical; shapes and area sizes of every second calibration areas are identical; and shapes and area sizes of every third calibration areas are identical. However, person having ordinary skill in the art can understand a shape and an area size of a given calibration area may be different from any other calibration areas.

A purpose to designate a calibration area is to establish a pressure calibration function corresponding to the calibration area. The calibration function may be generated according to measured values of multiple calibration points. For example, a pressure calibration function corresponding to a first calibration area may be generated according to measured values of four calibration points at its four vertexes. A pressure calibration function corresponding to a second calibration area may be generated according to measured values of two calibration points at its two vertexes or may be a copy of a pressure calibration function corresponding to its adjacent first calibration area. For example, the pressure calibration function of the second calibration area 451 may be a copy of the pressure function of its adjacent first calibration area 461. The pressure calibration function of the second calibration area 456 may be a copy of the pressure function of its adjacent first calibration area 464. With regard to a pressure calibration function of a third calibration area, it may be a copy of a pressure calibration function of its adjacent calibration area. For example, the pressure calibration function of the third calibration area 441 may be a copy of the pressure calibration of the first calibration area 461 or a copy of the pressure calibration function of the second calibration area 451 or 453.

An example of so-called pressure calibration function is referred to a function with a measured pressure value as its input. The output of the pressure calibration function is a calibrated pressure value. In one embodiment, a pressure calibration function f is expressed in Formula 1.

$$f(P_m) = P_c = r \cdot P_m + e \quad \text{(Formula 1)}$$

where $P_m$ is a measured pressure value, $P_c$ is a calibrated pressure value, r is a coefficient of calibration, e is an error value.

Except for the aforementioned formula, person having ordinary skill in the art may understand that the so-called pressure calibration function may be realized by a quadratic function. When the error value e is a constant value, e.g., e may be zero, a pressure calibration function corresponding to a first calibration area may be generated as follow. In case a pressure force Pc is applied to a particular calibration point by a tool, a pressure value Pm is measured. Given a constant as the error value e, a coefficient r corresponding to the calibration point can be calculated according to Formula 1. Assuming that coordinates of the four calibration points are $(x_0, y_0)$, $(x_1, y_0)$, $(x_1, y_1)$ and $(x_0, y_1)$, four coefficients corresponding to the four calibration points can be calculated as $r_{0,0}, r_{1,0}, r_{1,1}$ and $r_{0,1}$, respectively. Next, a coefficient r corresponding to a point at (x, y) can be calculated according to Formula 2. Thus, the pressure calibration function applicable to the first calibration area is generated accordingly.

$$r = r_{0,0} + \frac{r_{0,1} - r_{0,0}}{y_1 - y_0}(y - y_0) + \frac{r_{1,0} - r_{0,0}}{x_1 - x_0}(x - x_0) + \frac{(r_{1,1} - r_{0,0}) - (r_{1,0} + r_{0,1})}{(y_1 - y_0)(x_1 - x_0)}(x - x_0)(y - y_0) \quad \text{(Formula 2)}$$

With regard to the second calibration areas 451, 452, 457 and 458, the y-axis coordinate of the two calibration points are identical. These two calibration points are located at $(x_0, y_0)$ and $(x_1, y_0)$. Two coefficients $r_{0,0}$ and $r_{1,0}$ can be calculated according to the aforementioned method. In one embodiment, Formula 3 can be deduced from Formula 2 to calculate a coefficient r corresponding to a point at (x, y). Thus, the pressure calibration function applicable to the second calibration areas 451, 452, 457 and 458 is generated accordingly.

$$r = r_{0,0} + \frac{r_{1,0} - r_{0,0}}{x_1 - x_0}(x - x_0) \quad \text{(Formula 3)}$$

With regard to the second calibration areas 453, 454, 455 and 456, the x-axis coordinate of the two calibration points are identical. These two calibration points are located at $(x_0, y_0)$ and $(x_0, y_1)$. Two coefficients $r_{0,0}$ and $r_{0,1}$ can be calculated according to the aforementioned method. In one embodiment, Formula 4 can be deduced from Formula 2 to calculate a coefficient r corresponding to a point at (x, y). Thus, the pressure calibration function applicable to the second calibration areas 453, 454, 455 and 456 is generated accordingly.

$$r = r_{0,0} + \frac{r_{0,1} - r_{0,0}}{y_1 - y_0}(y - y_0) \quad \text{(Formula 4)}$$

Only one calibration point is included in the third calibration areas 441~444. In one embodiment, the pressure calibration function applicable to the third calibration areas may reuse the coefficient r and the error e corresponding to the only one calibration point.

Figure 5:
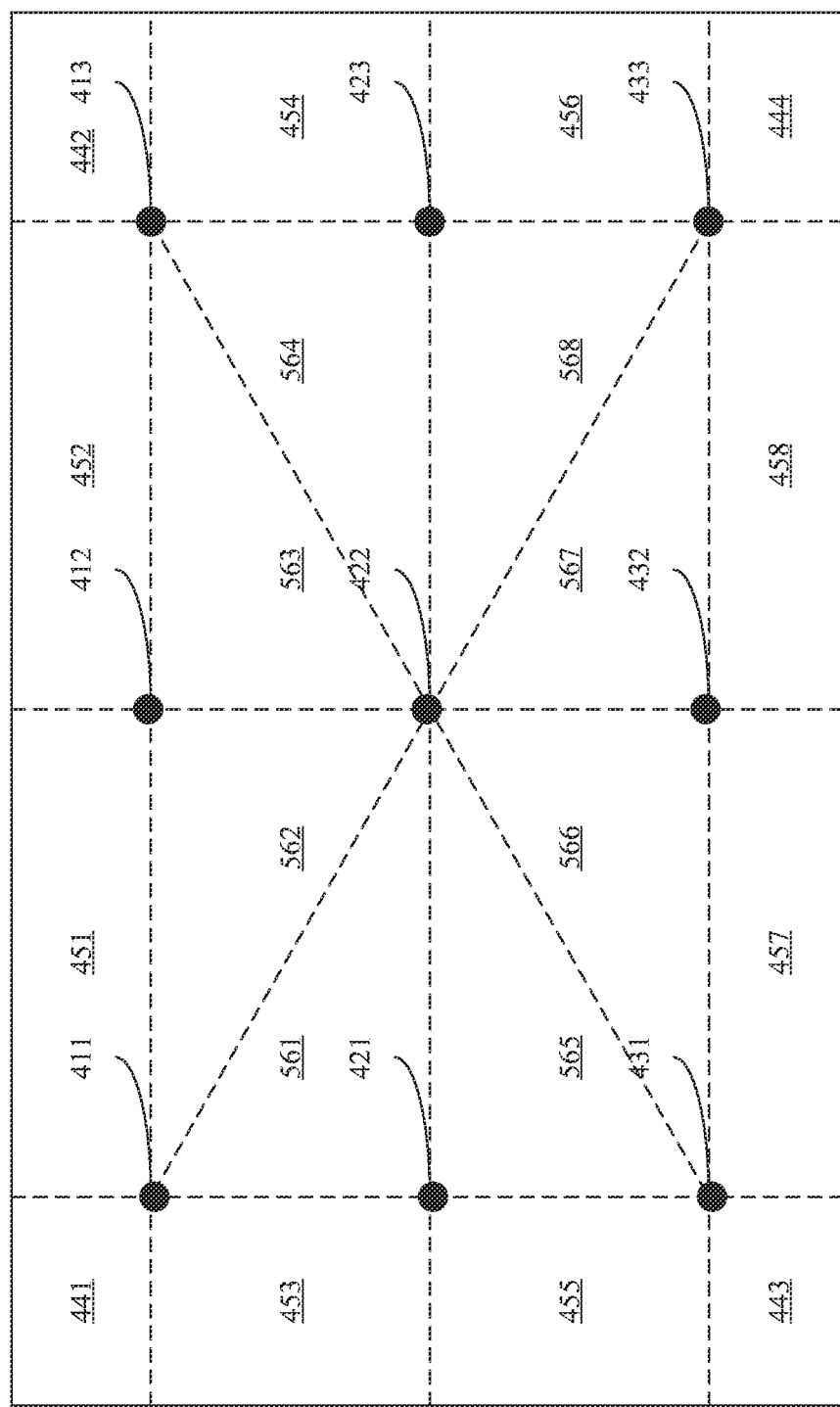
FIG. 5 illustrates calibration points and calibration areas in accordance with an embodiment of the present application.

Please refer to FIG. 5, which illustrates calibration points and calibration areas in accordance with an embodiment of the present application. In the embodiment as shown in FIG. 5, the rectangular first calibration areas as shown in FIG. 4 are divided into two triangular fourth calibration areas. For examples, the first calibration area 461 is divided into two fourth calibration areas 561 and 562. The first calibration area 462 is divided into two fourth calibration areas 563 and 564. The division methods applied to these two first calibration areas 461 and 462 may be different. The former is dissected by a diagonal line between the upper left vertex and the lower right vertex. The latter is divided by a diagonal line between the upper right vertex and the lower left vertex. Person having ordinary skill in the art can understand that a triangular fourth calibration area is defined by any given three calibration points. Since the second and the third calibration area have less than three calibration points, they may not be divided further.

Given that the coordinates of three calibration points are $(x_0, y_0)$, $(x_1, y_0)$ and $(x_1, y_1)$, three coefficient values $r_{0,0}, r_{1,0}$ and $r_{1,1}$ can be calculated according to the aforementioned method. Next, a coefficient r corresponding to a point at (x, y) can be calculated according to Formula 5. Thus, the pressure calibration function applicable to the fourth calibration areas is generated accordingly.

$$r = r_{0,0} + \frac{r_{1,0} - r_{0,0}}{x_1 - x_0}(x - x_0) + \frac{r_{1,1} - r_{1,0}}{y_1 - y_0}(y - y_0) \quad \text{(Formula 5)}$$

Given that the coordinates of three calibration points are $(x_0, y_0)$, $(x_0, y_1)$ and $(x_1, y_1)$, three coefficient values $r_{0,0}, r_{0,1}$ and $r_{1,1}$ can be calculated according to the aforementioned method. Next, a coefficient r corresponding to a point at (x, y) can be calculated according to Formula 6. Thus, the pressure calibration function applicable to the fourth calibration areas is generated accordingly.

$$r = r_{0,0} + \frac{r_{0,1} - r_{0,0}}{y_1 - y_0}(y - y_0) + \frac{r_{1,1} - r_{0,1}}{x_1 - x_0}(x - x_0) \quad \text{(Formula 6)}$$

With regard to the embodiments as shown in FIGS. 4 and 5, a difference between the measured pressure value and the calibrated pressure value corresponding to a calibration point may be allowed to fall into a range. However, in case that the difference corresponding to a specified calibration point is out of the range, more special calibration points may be designated to peripheral points around the specified abnormal calibration point. A special calibration area is formed by the abnormal specified calibration point and its corresponding special calibration points. A particular pressure calibration function applied to the special calibration area can be calculated accordingly.

Figure 6:
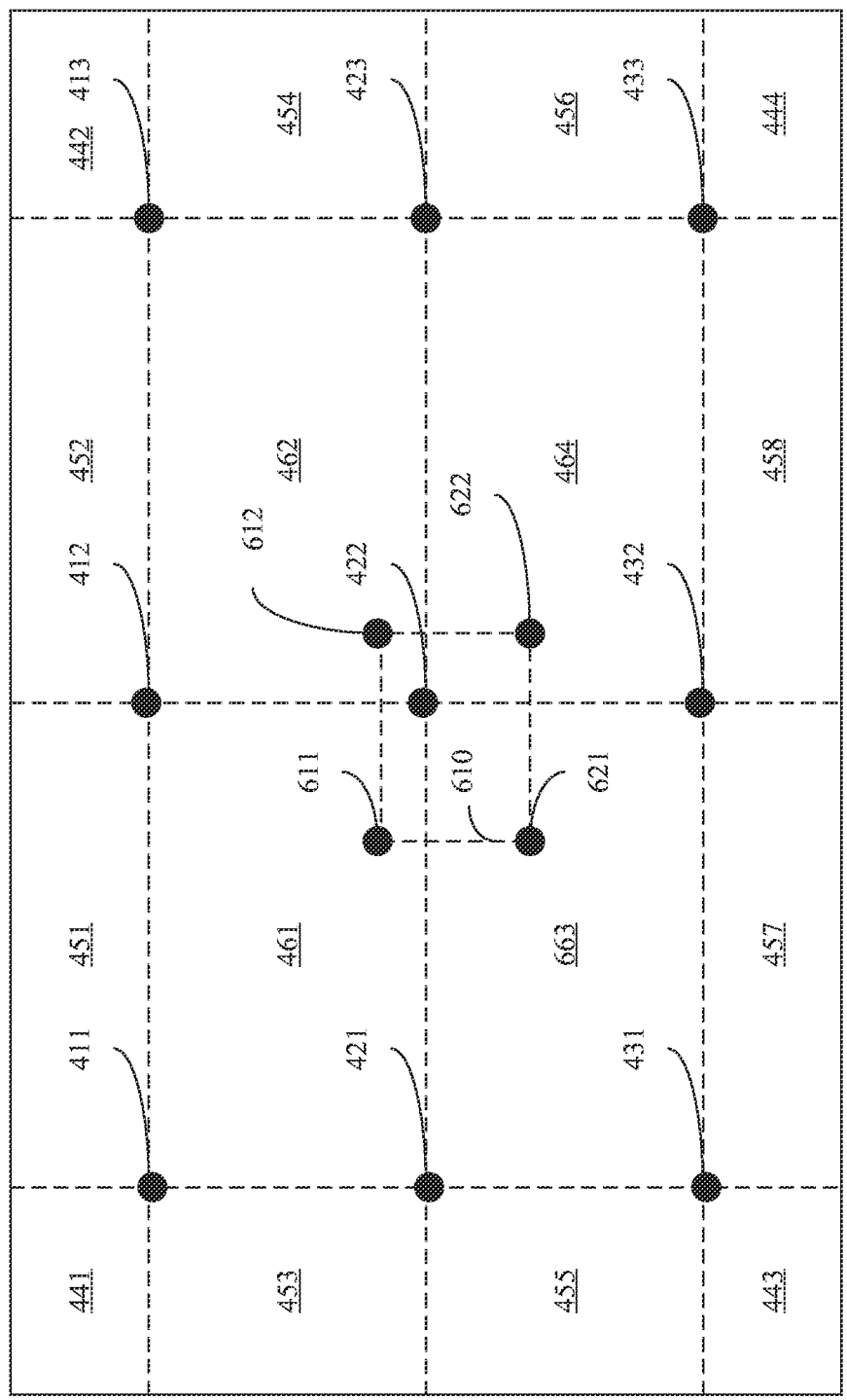
FIG. 6 illustrates special calibration points and a special calibration area in accordance with an embodiment of the present application.

Please refer to FIG. 6, which illustrates special calibration points and a special calibration area in accordance with an embodiment of the present application. In the embodiment as shown in FIG. 6, the measured pressure value corresponding to the calibration point 422 is abnormal. However, the difference shows it's corresponding to a still acceptable defect. Hence, multiple special calibration points 611, 612, 621 and 622 are designated around the abnormal calibration point 422. A special calibration area 610 is formed by the special calibration points 611, 612, 621 and 622. And the abnormal calibration point 422 resides inside the special calibration area 610. Besides, a triangular calibration area (not shown) is formed by the special calibration points 611, 612, 622. And the abnormal calibration point 422 resides inside the special triangular calibration area, too.

In one embodiment, the calibration measurement method can be applied to the rectangular special calibration area. Next, Formula 2 may be applied to generate the pressure calibration function corresponding to the special calibration area. In an alternative embodiment, the calibration measurement method can be applied to the triangular special calibration area. Next, Formula 5 or Formula 6 may be applied to generate the pressure calibration function corresponding to the special calibration area. However, when applying Formula 2, two adjacent edges of the rectangular calibration area have to be in parallel to long edge and short edge of the touch screen 120, respectively. In order to utilizing Formula 5 or 6, two adjacent edges of the triangular calibration area have to be in parallel to long edge and short edge of the touch screen 120, respectively, too.

If one of measured pressure values corresponding to the three or four special calibration points is out of the normal range, all of these special calibration points may be abandoned. A larger special calibration area containing the original special calibration area may be designated until all of measured pressure values corresponding to all special calibration points of the larger special calibration area are in the normal range. After that, the pressure calibration function corresponding to the larger special calibration area can be derived.

Figure 7:
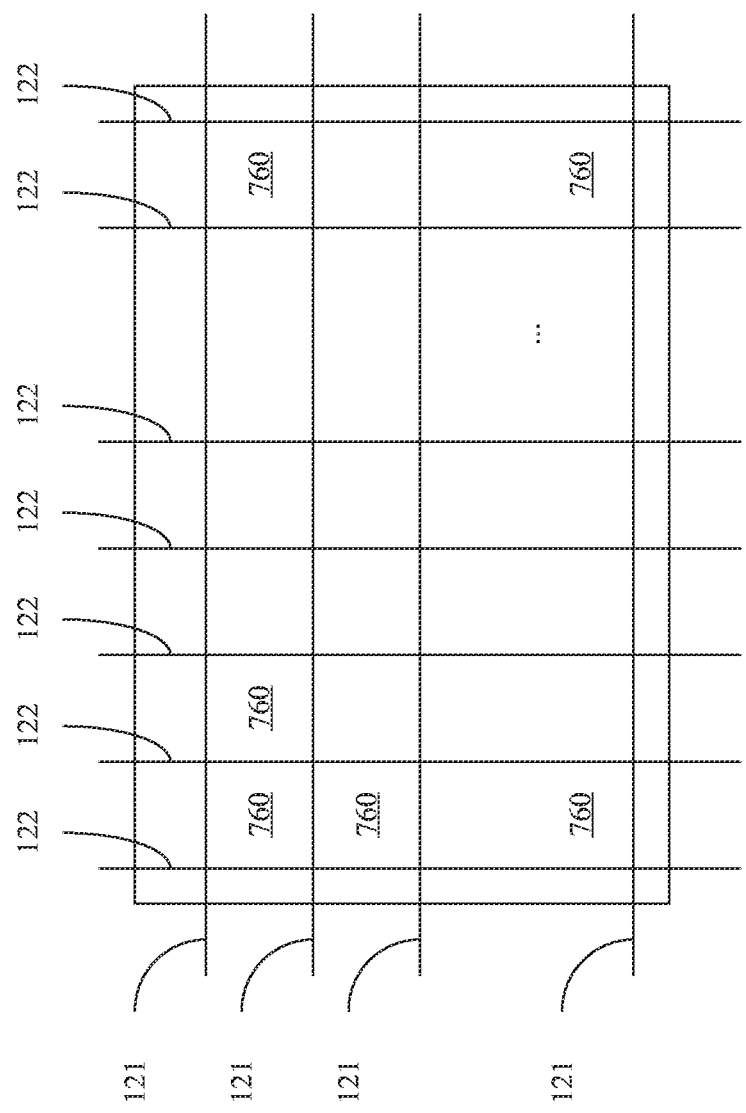
FIG. 7 illustrates calibration areas according to an embodiment of the present application.

Please refer to FIG. 7, which illustrates calibration areas according to an embodiment of the present application. In the embodiment as shown in FIG. 7, each intersection of the first electrodes 121 and the second electrodes 122 is a calibration point. Being applied to the embodiment as shown in FIGS. 2B and 2C, the elastic dielectric layer 124 is disposed in between the first electrodes 121 and the second electrodes 122. However, when applying to the embodiment as shown in FIG. 2A, each intersection of the second electrodes 122 and the third electrodes 123 is a calibration point.

Since the present application utilizes changes of mutual capacitance caused by the thickness of the elastic dielectric layer 124 to detect pressure values. Measured pressure values corresponding to all the intersections can form a two-dimensional pressure value image for detecting one or more external objects. In this embodiment as shown in FIG. 7, many first calibration areas 760 which have identical shape and area size are designated. Based on the two-dimensional pressure value image and Formula 2, pressure calibration functions corresponding to these first calibration areas 760 can be found.

Figure 8:
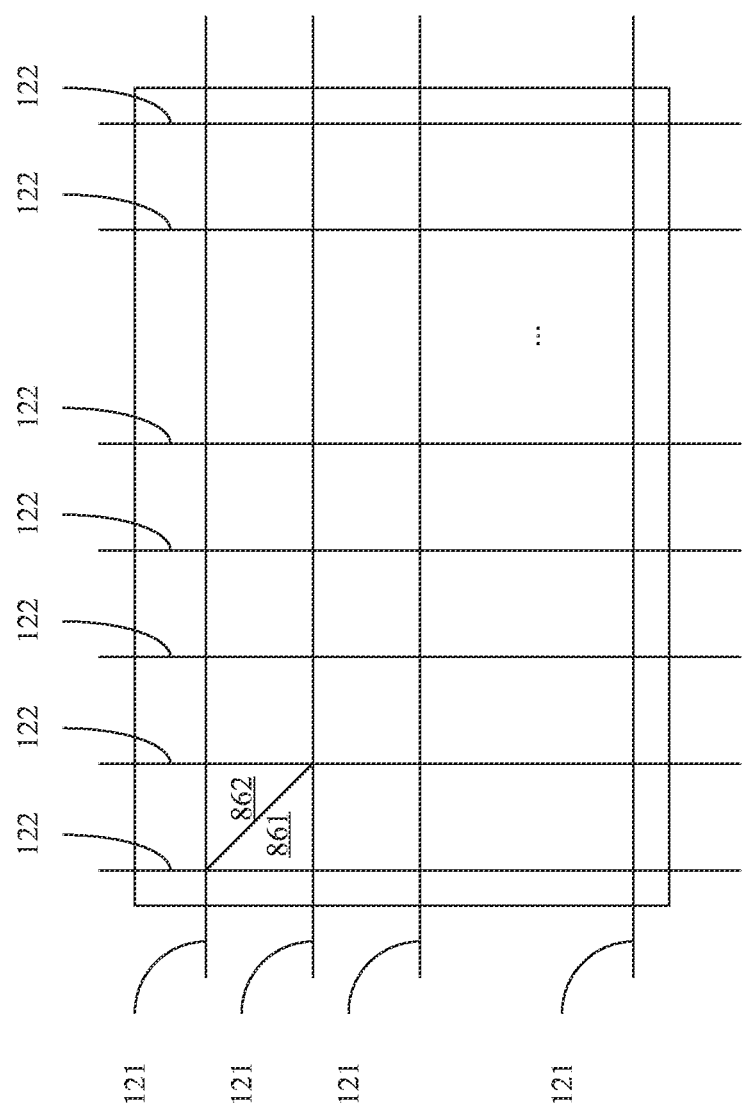
FIG. 8 illustrates calibration areas according to an embodiment of the present application.

Please refer to FIG. 8, which illustrates calibration areas according to an embodiment of the present application. Like the embodiment as shown in FIG. 7, each intersection of the first electrodes 121 and the second electrodes 122 is a calibration point. Being applied to the embodiment as shown in FIGS. 2B and 2C, the elastic dielectric layer 124 is disposed in between the first electrodes 121 and the second electrodes 122. However, when applying to the embodiment as shown in FIG. 2A, each intersection of the second electrodes 122 and the third electrodes 123 is a calibration point.

In this embodiment, many fourth calibration areas 861 and 862 are designated. Based on the two-dimensional pressure value image, pressure calibration functions corresponding to these fourth calibration areas 861 and 862 with identical area size can be found according to Formula 5 and Formula 6, respectively.

Figure 9:
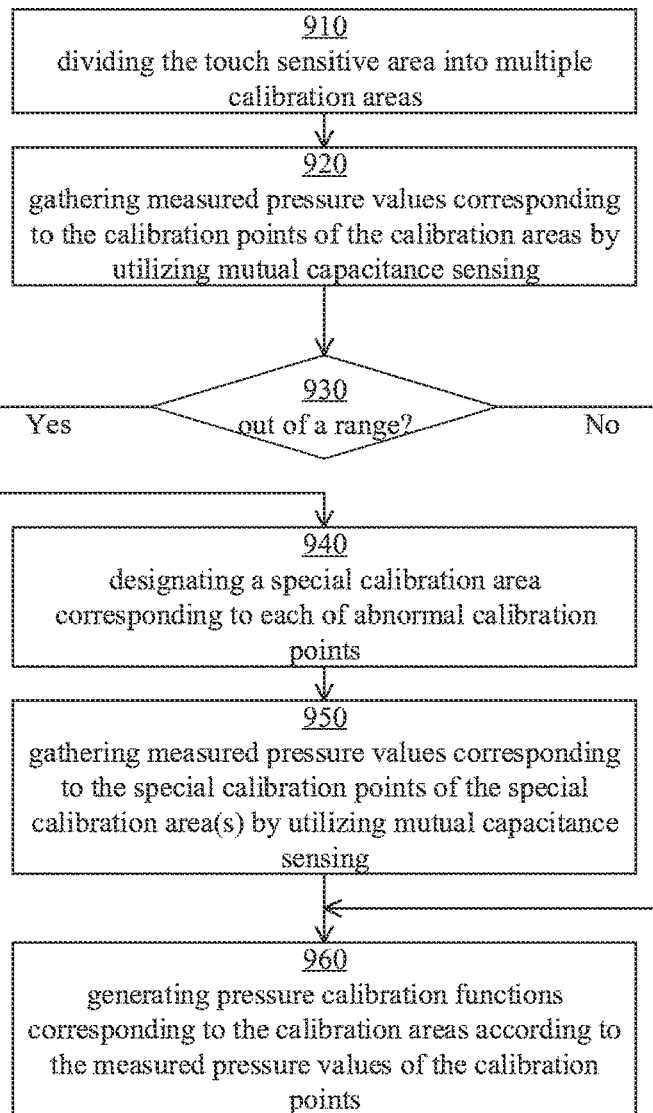
FIG. 9 depicts a pressure calibration function calculation method in accordance with an embodiment of the present application.

Please refer to FIG. 9, which depicts a pressure calibration function calculation method in accordance with an embodiment of the present application. The pressure calibration function calculation method 900 may be realized by the touch sensitive processing apparatus 110 as shown in FIG. 1. Especially, the method may be implemented as a group of instructions and data stored in non-volatile memory and the instructions being executable by the processor 114. If no causal relationship is mentioned, the present application does not limit the execution order of any given two steps. The pressure calibration function calculation method 900 begins at step 910.

Step 910: dividing the touch sensitive area into multiple calibration areas. Each of the calibration areas includes at least one calibration point. For examples, the aforementioned first, second, third and fourth calibration areas. Each of the calibration areas may include two adjacent edges which are in parallel to two adjacent edges of the touch screen, respectively.

Step 920: gathering measured pressure values corresponding to the calibration points of the calibration areas by utilizing mutual capacitance sensing mechanism. The mutual capacitance sensing is to detect changes of mutual capacitance values caused by changes of distances between two touch electrodes. At this step, a verified standard test pressure is applied to the calibration points and the measured pressure values corresponding to the calibration points are sensed, respectively. In case a calibration point is at an intersection of the two touch electrodes, a variation of sensing values corresponding to the calibration point may be viewed as the measured pressure value. Alternatively, in case the calibration point is not designated at an intersection of the two touch electrodes, person having ordinary skill in the art can understand that the measured pressure value corresponding to the calibration point can be calculated according to the two-dimensional pressure value image gathered by utilizing mutual capacitance sensing mechanism. Next, the flow may proceed to optional step 930 or to step 960.

Optional step 930: determining whether any one of the measured pressure values is out of a range. In case there is, the flow proceeds to step 940. Otherwise, the flow proceeds to step 960. The range may be defined by a low value and a high value. A normal measured pressure value resides in between the low and the high values.

Step 940: designating a special calibration area corresponding to each of abnormal calibration points. The special calibration area may include the corresponding abnormal calibration point. If the abnormal calibration point resides at an edge of the touch screen, the abnormal calibration point may be one vertex of the special calibration area.

Step 950: similar to step 920, gathering measured pressure values corresponding to the special calibration points of the special calibration area(s) by utilizing mutual capacitance sensing mechanism.

Step 960: generating pressure calibration functions corresponding to the calibration areas according to the measured pressure values of the calibration points. The pressure calibration function calculation method 900 may generate the pressure calibration function corresponding to each of the calibration areas. The second calibration areas reside around the edges may reuse the pressure calibration function corresponding to the adjacent first or fourth calibration area or the pressure calibration function generated according to Formula 3 or Formula 4. The third calibration areas at the corners may reuse the pressure calibration function corresponding to the adjacent first or fourth calibration area or reuse the pressure calibration function corresponding to its only one calibration point. In an embodiment, it does not bother to generate pressure calibration functions corresponding to the second calibration areas residing around the edges and generate pressure calibration functions corresponding to the third calibration areas residing at the corners. In other words, it does not designate the second calibration areas and/or the third calibration areas in order to preserve memory space from saving their corresponding pressure calibration functions.

Figure 10:
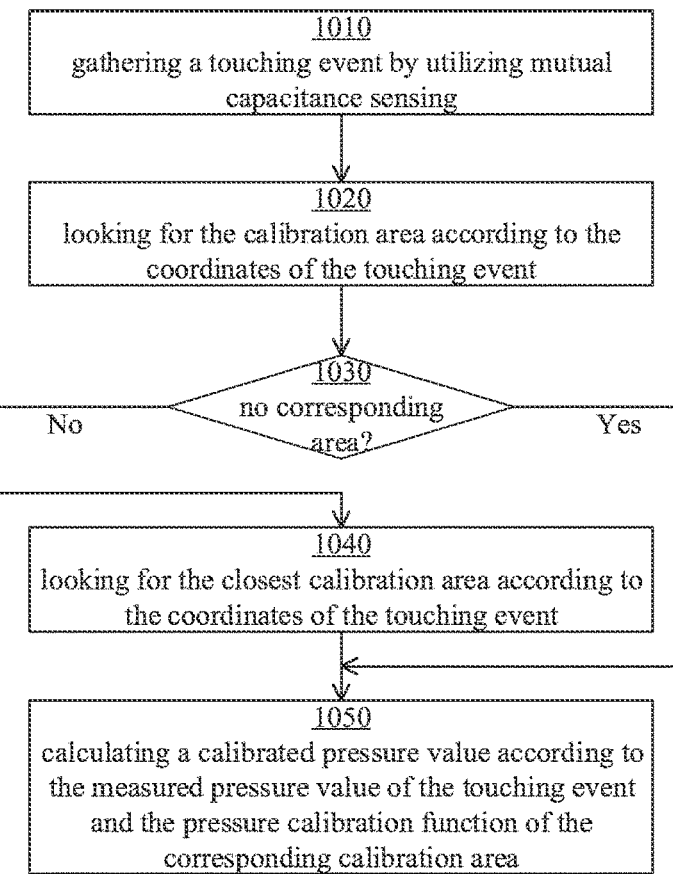
FIG. 10 depicts a pressure calibration method in accordance with an embodiment of the present application.

Please refer to FIG. 10, which depicts a pressure calibration method in accordance with an embodiment of the present application. The pressure calibration method 1000 may be applied to the touch screens 120 as shown in FIGS. 2A through 2C and be realized by the touch sensitive processing apparatus 110 as shown in FIG. 1. Especially, the method may be implemented as a group of instructions and data stored in non-volatile memory and the instructions being executable by the processor 114. If no causal relationship is mentioned, the present application does not limit the execution order of any given two steps. The pressure calibration method 1000 begins at step 1010.

Step 1010: gathering a touching event by utilizing mutual capacitance sensing. When an external object touches and presses the touch screen 120, distances between the touch electrodes are shortened and mutual capacitance values would be changed accordingly. Person having ordinary skill in the art can understand that a two dimensional pressure value image can be gathered by utilizing mutual capacitance sensing. Hence, coordinates and measured pressure values corresponding to the touching event can be calculated according to the two-dimensional pressure value image.

Step 1020: looking for a calibration area according to the coordinates of the touching event. If all of the areas around the corners and the edges of the touch screen 120 are corresponding to their calibration areas, the flow may directly proceeds to step 1050. However, if the areas around the corners and the edges of the touch screen 120 are not designated to a calibration area, the flow may proceed to step 1030:

Step 1030: determining whether the touching event is not corresponding to a calibration area. In case the touching event is happened around the corners or the edges of the touch screen 120, the flow may proceed to step 1040. Otherwise, the flow proceeds to step 1050

Step 1040: looking for the closest calibration area according to the coordinates of the touching event. As discussed above, the closest first calibration area or the fourth calibration area may be designated as the corresponding calibration area.

Step 1050: calculating a calibrated pressure value according to the measured pressure value of the touching event and the pressure calibration function of the corresponding calibration area. Thus, the touch sensitive processing apparatus 110 may update the pressure value corresponding to the touching event and report the touching event to the host 140.

Figure 11:
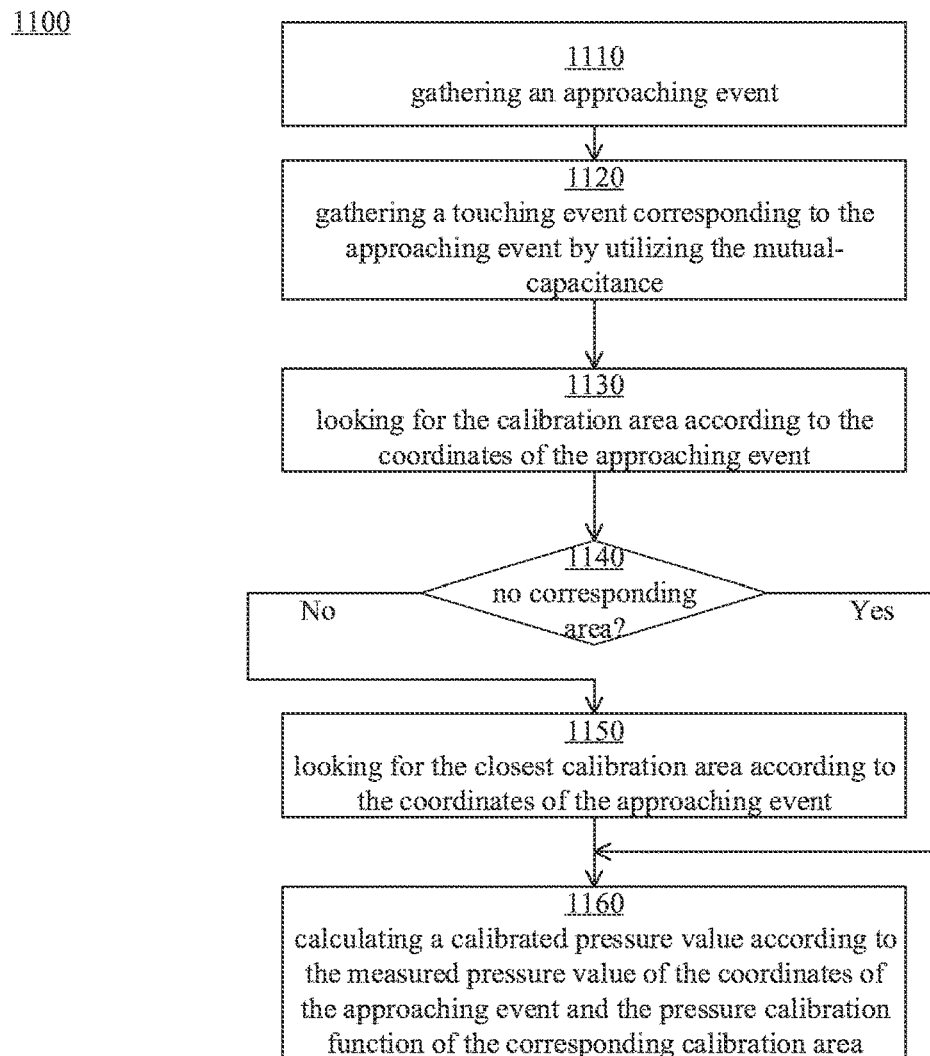
FIG. 11 depicts a pressure calibration method in accordance with an embodiment of the present application.

Please refer to FIG. 11, which depicts a pressure calibration method in accordance with an embodiment of the present application. The pressure calibration method 1100 may be applied to the touch screens 120 as shown in FIGS. 2A and 2B and be realized by the touch sensitive processing apparatus 110 as shown in FIG. 1. Especially, the method may be implemented as a group of instructions and data stored in non-volatile memory and the instructions being executable by the processor 114. If no causal relationship is mentioned, the present application does not limit the execution order of any given two steps. The pressure calibration method 1100 begins at step 1110.

The touch screens 120 as shown in FIGS. 2A, 2B and 2D can be used to gather approaching events and touching events. The approaching event may be detected by changes of mutual capacitance values in between two touch electrodes caused by a nearby external conductive object. Hence, when an external conductive object approaches but not contact the touch screen 120, the touch sensitive processing apparatus 110 may detect a approaching event but not a touching event. Since the deformation of the elastic dielectric layer 124 may be non-linear, the coordinates of the approaching event is usually closer to a position that the user intends to input comparing with the coordinates of the touching event. Therefore the pressure calibration method 1100 is designed to calibrate the measured pressure value corresponding to the coordinates of the touching event.

Step 1110: gathering an approaching event. Person having ordinary skill in the art can understand that the approaching event may be gathered according to self-capacitance sensing or mutual-capacitance sensing.

Step 1120: gathering a touching event corresponding to the approaching event by utilizing the mutual-capacitance sensing. As discussed above, there may not be a touching event corresponding to the approaching event. Step 1120 is designed to find out whether the approaching event which is corresponding to the touching event.

Step 1130: looking for the calibration area according to the coordinates of the approaching event. A difference to step 1020 is that step 1130 looks for the calibration area according to coordinates of the approaching event, not according to coordinates of the touching event. In case that all areas around the corners and the edges of the touch screen 120 have corresponding calibration areas, the flow may directly proceed to step 1160. However, in case that the areas around the corners and the edges of the touch screen 120 are not corresponding to calibration areas, the flow may proceed to step 1140.

Step 1140: determining whether the approaching event is not corresponding to any calibration area, i.e., in case the approaching event is happened around the corners or the edges, the flow proceeds to step 1150. Otherwise, the flow proceeds to step 1160.

Step 1150: looking for the closest calibration area according to the coordinates of the approaching event. As discussed above, the closest first calibration area or the fourth calibration area may be designated as the corresponding calibration area.

Step 1160: calculating a calibrated pressure value according to the measured pressure value of the coordinates of the approaching event and the pressure calibration function of the corresponding calibration area.

According to an embodiment of the present application, a pressure calibration method is provided. The pressure calibration method is applicable to a touch panel which sequentially comprises a layer of first electrodes, an elastic dielectric layer, and a layer of second electrodes. The layer of first electrodes includes multiple first electrodes in parallel to a first axis. The layer of second electrodes includes multiple second electrodes in parallel to a second axis. The pressure calibration method comprising: gathering a touching event by utilizing mutual capacitance sensing between the first electrodes and the second electrodes; looking for a corresponding calibration area according to coordinates of the touching event; and calculating a calibrated pressure value according to a measured pressure value corresponding to the touching event and a pressure calibration function corresponding to the calibration area.

Preferably, in order to reduce memory space for storing calibration areas and their corresponding pressure calibration functions, the pressure calibration method further comprises: when a calibration area where the touching event locates exists, taking the found calibration area as the corresponding calibration area; and when no calibration area where the touching event locates exists, taking a nearby calibration area which is closest to the touching event as the corresponding calibration area.

Preferably, in order to reduce calculations of the pressure calibration functions when the calibration points are designated to intersections of the first electrodes and the second electrodes, the calibration area is one of followings: a triangle, wherein two edges of the triangle are in parallel to two adjacent edges of the touch panel, respectively; and a rectangle, wherein two adjacent edges of the rectangle are in parallel to two adjacent edges of the touch panel, respectively.

Preferably, in order to cope with variations of measured pressure values corresponding to the calibration area, the pressure calibration function is based on coordinates of at least one vertex of the calibration area, at least one standard test pressure value and at least one measured pressure value.

Preferably, in order to conveniently designate coordinates of the vertexes and to measure at an intersection where one of the first electrodes is closest to one of the second electrodes, the vertexes are designated to intersections of the first electrodes and the second electrodes.

According to an embodiment of the present application, a pressure calibration method is provided. The pressure calibration method is applicable to a touch panel which sequentially comprises a layer of first electrodes, an elastic dielectric layer, a layer of second electrodes. The layer of first electrodes includes multiple first electrodes in parallel to a first axis. The layer of second electrodes includes multiple second electrodes in parallel to a second axis. The touch panel further includes multiple third layers in parallel to the first axis. The pressure calibration method comprising: gathering an approaching event by utilizing the second electrodes and the third electrodes; gathering a touching event corresponding to the approaching event by utilizing mutual capacitance sensing between the first electrodes and the second electrodes; looking for a calibration area according to the approaching event; and calculating a calibrated pressure value according to a measured pressure value corresponding to the approaching event and a pressure calibration function corresponding to the calibration area.

Preferably, in order to reduce memory space for storing calibration areas and their corresponding pressure calibration functions, the pressure calibration method further comprises: when a calibration area where the approaching event locates exists, taking the found calibration area as the corresponding calibration area; and when no calibration area where the touching event locates exists, taking a nearby calibration area which is closest to the approaching event as the corresponding calibration area.

Preferably, in order to reduce calculations of the pressure calibration functions when the calibration points are designated to intersections of the first electrodes and the second electrodes, the calibration area is one of followings: a triangle, wherein two edges of the triangle are in parallel to two adjacent edges of the touch panel, respectively; and a rectangle, wherein two adjacent edges of the rectangle are in parallel to two adjacent edges of the touch panel, respectively.

Preferably, in order to cope with variations of measured pressure values corresponding to the calibration area, the pressure calibration function is based on coordinates of at least one vertex of the calibration area, at least one standard test pressure value and at least one measured pressure value.

Preferably, in order to conveniently designate coordinates of the vertexes and to measure at an intersection where one of the first electrodes is closest to one of the second electrodes, the vertexes are designated to intersections of the first electrodes and the second electrodes.

According to an embodiment of the present application, a touch sensitive processing apparatus for pressure calibration is provided. The touch sensitive processing apparatus is coupled to a touch panel which sequentially comprises a layer of first electrodes, an elastic dielectric layer, and a layer of second electrodes. The layer of first electrodes includes multiple first electrodes in parallel to a first axis. The layer of second electrodes includes multiple second electrodes in parallel to a second axis. The touch sensitive processing apparatus comprising: an interconnection network, configured to connect to one or more the first electrodes and one or more the second electrodes, respectively; a driving circuit, configured to connect to the interconnection network for transmitting driving signals; a sensing circuit, configured to connect to the interconnection network for sensing induced driving signals; and a processor, coupled to the interconnection network, the driving circuit and the sensing circuit, configured to execute instructions stored in a non-volatile memory to realize the following steps: gathering a touching event by utilizing mutual capacitance sensing between the first electrodes and the second electrodes; looking for a corresponding calibration area according to coordinates of the touching event; and calculating a calibrated pressure value according to a measured pressure value corresponding to the touching event and a pressure calibration function corresponding to the calibration area.

Preferably, in order to reduce memory space for storing calibration areas and their corresponding pressure calibration functions, the processor is further configured to realize the following steps: when a calibration area where the touching event locates exists, taking the found calibration area as the corresponding calibration area; and when no calibration area where the touching event locates exists, taking a nearby calibration area which is closest to the touching event as the corresponding calibration area.

Preferably, in order to reduce calculations of the pressure calibration functions when the calibration points are designated to intersections of the first electrodes and the second electrodes, the calibration area is one of followings: a triangle, wherein two edges of the triangle are in parallel to two adjacent edges of the touch panel, respectively; and a rectangle, wherein two adjacent edges of the rectangle are in parallel to two adjacent edges of the touch panel, respectively.

Preferably, in order to cope with variations of measured pressure values corresponding to the calibration area, the pressure calibration function is based on coordinates of at least one vertex of the calibration area, at least one standard test pressure value and at least one measured pressure value.

Preferably, in order to conveniently designate coordinates of the vertexes and to measure at an intersection where one of the first electrodes is closest to one of the second electrodes, the vertexes are designated to intersections of the first electrodes and the second electrodes.

According to an embodiment of the present application, a touch sensitive processing apparatus for pressure calibration is provided. The touch sensitive processing apparatus is coupled to a touch panel which sequentially comprises a layer of first electrodes, an elastic dielectric layer, and a layer of second electrodes. The layer of first electrodes includes multiple first electrodes in parallel to a first axis. The layer of second electrodes includes multiple second electrodes in parallel to a second axis. The touch panel further includes multiple third layers in parallel to the first axis. The touch sensitive processing apparatus comprising: an interconnection network, configured to connect to one or more the first electrodes, one or more the second electrodes and one or more the third electrodes, respectively; a driving circuit, configured to connect to the interconnection network for transmitting driving signals; a sensing circuit, configured to connect to the interconnection network for sensing induced driving signals; and a processor, coupled to the interconnection network, the driving circuit and the sensing circuit, configured to execute instructions stored in a non-volatile memory to realize the following steps: gathering an approaching event by utilizing the second electrodes and the third electrodes; gathering a touching event corresponding to the approaching event by utilizing mutual capacitance sensing between the first electrodes and the second electrodes; looking for a calibration area according to the approaching event; and calculating a calibrated pressure value according to a measured pressure value corresponding to the approaching event and a pressure calibration function corresponding to the calibration area.

Preferably, in order to reduce memory space for storing calibration areas and their corresponding pressure calibration functions, the processor is further configured to realize following steps: when a calibration area where the approaching event locates exists, taking the found calibration area as the corresponding calibration area; and when no calibration area where the touching event locates exists, taking a nearby calibration area which is closest to the approaching event as the corresponding calibration area.

Preferably, in order to reduce calculations of the pressure calibration functions when the calibration points are designated to intersections of the first electrodes and the second electrodes, the calibration area is one of followings: a triangle, wherein two edges of the triangle are in parallel to two adjacent edges of the touch panel, respectively; and a rectangle, wherein two adjacent edges of the rectangle are in parallel to two adjacent edges of the touch panel, respectively.

Preferably, in order to cope with variations of measured pressure values corresponding to the calibration area, the pressure calibration function is based on coordinates of at least one vertex of the calibration area, at least one standard test pressure value and at least one measured pressure value.

Preferably, in order to conveniently designate coordinates of the vertexes and to measure at an intersection where one of the first electrodes is closest to one of the second electrodes, the vertexes are designated to intersections of the first electrodes and the second electrodes.

According to an embodiment of the present application, a touch system for pressure calibration is provided. The touch system comprising the aforementioned touch sensitive processing apparatus; and the touch panel coupled to the touch sensitive processing apparatus.

According to an embodiment of the present application, a pressure calibration function calculation method is provided. The pressure calibration function calculation method is applied to a touch panel which sequentially comprises a layer of first electrodes, an elastic dielectric layer, and a layer of second electrodes. The layer of first electrodes includes multiple first electrodes in parallel to a first axis. The layer of second electrodes includes multiple second electrodes in parallel to a second axis. The pressure calibration function calculation method comprising: by utilizing mutual capacitance sensing between the first electrodes and the second electrodes, measuring pressure values corresponding to calibration points when being pressed by a standard test pressure value, wherein the touch panel comprises multiple calibration areas and each calibration area corresponds to one or more of the calibration points; and calculating a pressure calibration function corresponding to each of the calibration areas according to coordinates of the calibration points, the standard test pressure value and the measured pressure values of the calibration points.

Preferably, in order to further calibrate around the calibration point corresponding to abnormal measured pressure value, the pressure calibration function calculation method further comprises: determining whether the measured pressure values corresponding to the calibration points are out of a range; when one of the measured pressure values is determined out of the range, designating a special calibration area, wherein the special calibration area comprises multiple special calibration points and the calibration point corresponding to the measured pressure value which is out of the range; by utilizing mutual capacitance sensing between the first electrodes and the second electrodes, measuring pressure values corresponding to the special calibration points when being pressed by the standard test pressure value; and calculating a pressure calibration function corresponding to the special calibration area according to coordinates of the special calibration points, the standard test pressure value and the measured pressure values of the special calibration points.

Preferably, in order to reduce calculations of the pressure calibration functions when the calibration points are designated to intersections of the first electrodes and the second electrodes, the calibration area is one of followings: a triangle, wherein two edges of the triangle are in parallel to two adjacent edges of the touch panel, respectively; and a rectangle, wherein two adjacent edges of the rectangle are in parallel to two adjacent edges of the touch panel, respectively.

Preferably, in order to conveniently designate coordinates of the vertexes and to measure at an intersection where one of the first electrodes is closest to one of the second electrodes, the vertexes are designated to intersections of the first electrodes and the second electrodes.

Preferably, in order to provide the pressure calibration function corresponding to a triangular or a rectangular calibration area, the pressure calibration function is denoted as $f(P_m)=P_c=r \cdot P_m+e$, where $P_m$ is a measured pressure value, $P_c$ is a calibrated pressure value, r is a coefficient of calibration, e is an error value, when the rectangular calibration area is corresponding to four of the calibration points at $(x_0, y_0)$, $(x_1, y_0)$, $(x_1, y_1)$ and $(x_0, y_1)$, respectively, and their coefficients are $r_{0,0}$, $r_{1,0}$, $r_{1,1}$ and $r_{0,1}$, respectively, the coefficient r of a point (x, y) in the calibration area is denoted as $$r = r_{0,0} + \frac{r_{0,1} - r_{0,0}}{y_1 - y_0}(y - y_0) + \frac{r_{1,0} - r_{0,0}}{x_1 - x_0}(x - x_0) + \frac{(r_{1,1} - r_{0,0}) - (r_{1,0} + r_{0,1})}{(y_1 - y_0)(x_1 - x_0)}(x - x_0)(y - y_0),$$

when the rectangular calibration area is corresponding to two of the calibration points at $(x_0, y_0)$ and $(x_1, y_0)$, respectively, and their coefficients are $r_{0,0}$ and $r_{1,0}$ respectively, the coefficient r of a point (x, y) in the calibration area is denoted as $$r = r_{0,0} + \frac{r_{1,0} - r_{0,0}}{x_1 - x_0}(x - x_0),$$

when the rectangular calibration area is corresponding to two of the calibration points at $(x_0, y_0)$ and $(x_0, y_1)$, respectively, and their coefficients are $r_{0,0}$ and $r_{0,1}$, respectively, the coefficient r of a point (x, y) in the calibration area is denoted as $$r = r_{0,0} + \frac{r_{0,1} - r_{0,0}}{y_1 - y_0}(y - y_0),$$

when the triangular calibration area is corresponding to three of the calibration points at $(x_0, y_0)$, $(x_1, y_0)$ and $(x_1, y_1)$, respectively, and their coefficients are $r_{0,0}$, $r_{1,0}$ and $r_{1,1}$ respectively, the coefficient r of a point (x, y) in the calibration area is denoted as $$r = r_{0,0} + \frac{r_{1,0} - r_{0,0}}{x_1 - x_0}(x - x_0) + \frac{r_{1,1} - r_{1,0}}{y_1 - y_0}(y - y_0),$$

when the triangular calibration area is corresponding to three of the calibration points at $(x_0, y_0)$, $(x_0, y_1)$ and $(x_1, y_1)$, respectively, and their coefficients are $r_{0,0}$, $r_{0,1}$ and $r_{1,1}$, respectively, the coefficient r of a point (x, y) in the calibration area is denoted as $$r = r_{0,0} + \frac{r_{0,1} - r_{0,0}}{y_1 - y_0}(y - y_0) + \frac{r_{1,1} - r_{0,1}}{x_1 - x_0}(x - x_0).$$

According to an embodiment of the present application, a touch sensitive processing apparatus for pressure calibration function calculation is provided. The sensitive processing apparatus is coupled to a touch panel which sequentially comprises a layer of first electrodes, an elastic dielectric layer, and a layer of second electrodes. The layer of first electrodes includes multiple first electrodes in parallel to a first axis. The layer of second electrodes includes multiple second electrodes in parallel to a second axis. The touch sensitive processing apparatus comprising: an interconnection network, configured to connect one or more the first electrodes and one or more the second electrodes; a driving circuit, configured to transmit driving signals via the interconnection network, a sensing circuit, configured to sense induced driving signals via the interconnection network; and a processor, coupled to the interconnection network, the driving circuit and the sensing circuit, configured to execute instructions stored in non-volatile memory to realize the following steps: by utilizing mutual capacitance sensing between the first electrodes and the second electrodes, measuring pressure values corresponding to calibration points when being pressed by a standard test pressure value, wherein the touch panel comprises multiple calibration areas and each calibration area corresponds to one or more of the calibration points; and calculating a pressure calibration function corresponding to each of the calibration areas according to coordinates of the calibration points, the standard test pressure value and the measured pressure values of the calibration points.

Preferably, in order to further calibrate around the calibration point corresponding to abnormal measured pressure value, the processor is further configured to realize following steps: determining whether the measured pressure values corresponding to the calibration points are out of a range; when one of the measured pressure values is determined out of the range, designating a special calibration area, wherein the special calibration area comprises multiple special calibration points and the calibration point corresponding to the measured pressure value which is out of the range; by utilizing mutual capacitance sensing between the first electrodes and the second electrodes, measuring pressure values corresponding to the special calibration points when being pressed by the standard test pressure value; and calculating a pressure calibration function corresponding to the special calibration area according to coordinates of the special calibration points, the standard test pressure value and the measured pressure values of the special calibration points.

Preferably, in order to reduce calculations of the pressure calibration functions when the calibration points are designated to intersections of the first electrodes and the second electrodes, the calibration area is one of followings: a triangle, wherein two edges of the triangle are in parallel to two adjacent edges of the touch panel, respectively; and a rectangle, wherein two adjacent edges of the rectangle are in parallel to two adjacent edges of the touch panel, respectively.

Preferably, in order to conveniently designate coordinates of the vertexes and to measure at an intersection where one of the first electrodes is closest to one of the second electrodes, the vertexes are designated to intersections of the first electrodes and the second electrodes.

Preferably, in order to provide the pressure calibration function corresponding to a triangular or a rectangular calibration area, the pressure calibration function is denoted as $f(P_m) = P_c = r \cdot P_m + e$, where $P_m$ is a measured pressure value, $P_c$ is a calibrated pressure value, r is a coefficient of calibration, e is an error value, when the rectangular calibration area is corresponding to four of the calibration points at $(x_0, y_0)$, $(x_1, y_0)$, $(x_1, y_1)$ and $(x_0, y_1)$, respectively, and their coefficients are $r_{0,0}$, $r_{1,0}$, $r_{1,1}$ and $r_{0,1}$, respectively, the coefficient r of a point (x, y) in the calibration area is denoted as $$r = r_{0,0} + \frac{r_{0,1} - r_{0,0}}{y_1 - y_0}(y - y_0) + \frac{r_{1,0} - r_{0,0}}{x_1 - x_0}(x - x_0) + \frac{(r_{1,1} - r_{0,0}) - (r_{1,0} + r_{0,1})}{(y_1 - y_0)(x_1 - x_0)}(x - x_0)(y - y_0),$$

when the rectangular calibration area is corresponding to two of the calibration points at $(x_0, y_0)$ and $(x_1, y_0)$, respectively, and their coefficients are $r_{0,0}$ and $r_{1,0}$, respectively, the coefficient r of a point (x, y) in the calibration area is denoted as $$r = r_{0,0} + \frac{r_{1,0} - r_{0,0}}{x_1 - x_0}(x - x_0),$$

when the rectangular calibration area is corresponding to two of the calibration points at $(x_0, y_0)$ and $(x_0, y_1)$, respectively, and their coefficients are $r_{0,0}$ and $r_{0,1}$, respectively, the coefficient r of a point (x, y) in the calibration area is denoted as $$r = r_{0,0} + \frac{r_{0,1} - r_{0,0}}{y_1 - y_0}(y - y_0),$$

when the triangular calibration area is corresponding to three of the calibration points at $(x_0, y_0)$, $(x_1, y_0)$ and $(x_1, y_1)$, respectively, and their coefficients are $r_{0,0}$, $r_{1,0}$ and $r_{1,1}$, respectively, the coefficient r of a point (x, y) in the calibration area is denoted as $$r = r_{0,0} + \frac{r_{1,0} - r_{0,0}}{x_1 - x_0}(x - x_0) + \frac{r_{1,1} - r_{1,0}}{y_1 - y_0}(y - y_0),$$

when the triangular calibration area is corresponding to three of the calibration points at $(x_0, y_0)$, $(x_0, y_1)$ and $(x_1, y_1)$, respectively, and their coefficients are $r_{0,0}$, $r_{0,1}$ and $r_{1,1}$, respectively, the coefficient r of a point (x, y) in the calibration area is denoted as $$r = r_{0,0} + \frac{r_{0,1} - r_{0,0}}{y_1 - y_0}(y - y_0) + \frac{r_{1,1} - r_{0,1}}{x_1 - x_0}(x - x_0).$$

According to an embodiment of the present application, a touch system for pressure calibration function calculation is provided. The touch system comprising the aforementioned touch sensitive processing apparatus; and the touch panel coupled to the touch sensitive processing apparatus.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A pressure calibration method, applicable to a touch panel which sequentially comprises a layer of first electrodes, an elastic dielectric layer, and a layer of second electrodes, the layer of first electrodes includes multiple first electrodes in parallel to a first axis, the layer of second electrodes includes multiple second electrodes in parallel to a second axis, the pressure calibration method comprising:
    gathering a touching event by utilizing mutual capacitance sensing between the first electrodes and the second electrodes;
    looking for a corresponding calibration area according to coordinates of the touching event; and
    calculating a calibrated pressure value according to a measured pressure value corresponding to the touching event and a pressure calibration function corresponding to the calibration area, wherein the pressure calibration function is based on coordinates of at least one vertex of the calibration area, at least one standard test pressure value and at least one measured pressure value, wherein the vertexes are designated to intersections of the first electrodes and the second electrodes.

2. The pressure calibration method recited in claim 1, further comprises:
    when a calibration area where the touching event locates exists, taking the found calibration area as the corresponding calibration area; and
    when no calibration area where the touching event locates exists, taking a nearby calibration area which is closest to the touching event as the corresponding calibration area.

3. The pressure calibration method recited in claim 1, wherein the calibration area is one of following:
    a triangle, wherein two edges of the triangle are in parallel to two adjacent edges of the touch panel, respectively; and
    a rectangle, wherein two adjacent edges of the rectangle are in parallel to two adjacent edges of the touch panel, respectively.

4. A pressure calibration method, applicable to a touch panel which sequentially comprises a layer of first electrodes, an elastic dielectric layer, a layer of second electrodes, the layer of first electrodes includes multiple first electrodes in parallel to a first axis, the layer of second electrodes includes multiple second electrodes in parallel to a second axis, the touch panel further includes multiple third layers in parallel to the first axis, wherein the pressure calibration method comprising:
    gathering an approaching event by utilizing the second electrodes and the third electrodes;
    gathering a touching event corresponding to the approaching event by utilizing mutual capacitance sensing between the first electrodes and the second electrodes;
    looking for a calibration area according to the approaching event; and
    calculating a calibrated pressure value according to a measured pressure value corresponding to the approaching event and a pressure calibration function corresponding to the calibration area, wherein the pressure calibration function is based on coordinates of at least one vertex of the calibration area, at least one standard test pressure value and at least one measured pressure value, wherein the vertexes are designated to intersections of the first electrodes and the second electrodes.

5. The pressure calibration method recited in claim 4, further comprises:
    when a calibration area where the approaching event locates exists, taking the found calibration area as the corresponding calibration area; and
    when no calibration area where the touching event locates exists, taking a nearby calibration area which is closest to the approaching event as the corresponding calibration area.

6. The pressure calibration method recited in claim 4, wherein the calibration area is one of following:
    a triangle, wherein two edges of the triangle are in parallel to two adjacent edges of the touch panel, respectively; and
    a rectangle, wherein two adjacent edges of the rectangle are in parallel to two adjacent edges of the touch panel, respectively.

7. A touch sensitive processing apparatus for pressure calibration, wherein the touch sensitive processing apparatus is coupled to a touch panel which sequentially comprises a layer of first electrodes, an elastic dielectric layer, and a layer of second electrodes, the layer of first electrodes includes multiple first electrodes in parallel to a first axis, the layer of second electrodes includes multiple second electrodes in parallel to a second axis, wherein the touch sensitive processing apparatus comprising:
    an interconnection network, configured to connect to one or more the first electrodes and one or more the second electrodes, respectively;
    a driving circuit, configured to connect to the interconnection network for transmitting driving signals;

a sensing circuit, configured to connect to the interconnection network for sensing induced driving signals; and a processor, coupled to the interconnection network, the driving circuit and the sensing circuit, configured to execute instructions stored in a non-volatile memory to realize the following steps:

gathering a touching event by utilizing mutual capacitance sensing between the first electrodes and the second electrodes;

looking for a corresponding calibration area according to coordinates of the touching event; and calculating a calibrated pressure value according to a measured pressure value corresponding to the touching event and a pressure calibration function corresponding to the calibration area, wherein the pressure calibration function is based on coordinates of at least one vertex of the calibration area, at least one standard test pressure value and at least one measured pressure value, wherein the vertexes are designated to intersections of the first electrodes and the second electrodes.

8. The touch sensitive processing apparatus recited in claim 7, wherein the processor is further configured to realize the following steps:

when a calibration area where the touching event locates exists, taking the found calibration area as the corresponding calibration area; and when no calibration area where the touching event locates exists, taking a nearby calibration area which is closest to the touching event as the corresponding calibration area.

9. The touch sensitive processing apparatus recited in claim 7, wherein the calibration area is one of following:

a triangle, wherein two edges of the triangle are in parallel to two adjacent edges of the touch panel, respectively; and a rectangle, wherein two adjacent edges of the rectangle are in parallel to two adjacent edges of the touch panel, respectively.

10. A touch sensitive processing apparatus for pressure calibration, wherein the touch sensitive processing apparatus is coupled to a touch panel which sequentially comprises a layer of first electrodes, an elastic dielectric layer, and a layer of second electrodes, the layer of first electrodes includes multiple first electrodes in parallel to a first axis, the layer of second electrodes includes multiple second electrodes in parallel to a second axis, the touch panel further includes multiple third layers in parallel to the first axis, wherein the touch sensitive processing apparatus comprising:

an interconnection network, configured to connect to one or more the first electrodes and one or more the second electrodes, respectively;

a driving circuit, configured to connect to the interconnection network for transmitting driving signals;

a sensing circuit, configured to connect to the interconnection network for sensing induced driving signals; and a processor, coupled to the interconnection network, the driving circuit and the sensing circuit, configured to execute instructions stored in a non-volatile memory to realize the following steps:

gathering an approaching event by utilizing the second electrodes and the third electrodes;

gathering a touching event corresponding to the approaching event by utilizing mutual capacitance sensing between the first electrodes and the second electrodes;

looking for a calibration area according to the approaching event; and calculating a calibrated pressure value according to a measured pressure value corresponding to the approaching event and a pressure calibration function corresponding to the calibration area, wherein the pressure calibration function is based on coordinates of at least one vertex of the calibration area, at least one standard test pressure value and at least one measured pressure value, wherein the vertexes are designated to intersections of the first electrodes and the second electrodes.

11. The touch sensitive processing apparatus recited in claim 10, wherein the processor is further configured to realize following steps:

when a calibration area where the approaching event locates exists, taking the found calibration area as the corresponding calibration area; and when no calibration area where the touching event locates exists, taking a nearby calibration area which is closest to the approaching event as the corresponding calibration area.

12. The touch sensitive processing apparatus recited in claim 10, wherein the calibration area is one of following:

a triangle, wherein two edges of the triangle are in parallel to two adjacent edges of the touch panel, respectively; and a rectangle, wherein two adjacent edges of the rectangle are in parallel to two adjacent edges of the touch panel, respectively.

13. A touch system for pressure calibration, comprising:

the touch sensitive processing apparatus recited in any one of claims 7-9 and 10-12; and the touch panel coupled to the touch sensitive processing apparatus.

* * * * *